(12) United States Patent
Aust et al.

(10) Patent No.: US 11,757,781 B2
(45) Date of Patent: Sep. 12, 2023

(54) DEVICES AND METHODS FOR OPERATING A COMPUTING SYSTEM COMPRISING A DATA RELAY

(71) Applicant: Siemens Mobility GmbH, Munich (DE)

(72) Inventors: Frank Aust, Salzgitter (DE); Andreas Bolm, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 3 days.

(21) Appl. No.: 17/619,005

(22) PCT Filed: May 12, 2020

(86) PCT No.: PCT/EP2020/063125
§ 371 (c)(1),
(2) Date: Dec. 14, 2021

(87) PCT Pub. No.: WO2020/249341
PCT Pub. Date: Dec. 17, 2020

(65) Prior Publication Data
US 2022/0353188 A1    Nov. 3, 2022

(30) Foreign Application Priority Data

Jun. 14, 2019   (DE) .................... 10 2019 208 709.4

(51) Int. Cl.
*H04L 47/10* (2022.01)
*H04L 47/17* (2022.01)

(52) U.S. Cl.
CPC .............. *H04L 47/16* (2013.01); *H04L 47/17* (2013.01)

(58) Field of Classification Search
CPC ................................. H04L 47/16; H04L 47/17
See application file for complete search history.

(56) References Cited

U.S. PATENT DOCUMENTS 1,749,834 A * 3/1930 Myers ..................... B61L 3/222
246/39
2011/0055916 A1   3/2011 Ahn

FOREIGN PATENT DOCUMENTS

| AT | 509254 A1 | 7/2011 |
|---|---|---|
| DE | 19742330 C1 | 10/1998 |
| GB | 2503245 A | 12/2013 |

* cited by examiner

*Primary Examiner* — Duc C Ho
(74) *Attorney, Agent, or Firm* — Laurence A. Greenberg; Werner H. Stemer; Ralph E. Locher

(57) ABSTRACT

A computing system includes a computing device and an input data path connecting an interface device to the computing device. The input data path has at least two data relays and at least one buffer memory temporarily storing data. Each of the data relays has first and second terminals and a central terminal and selectively interconnects the first and central terminals or the second and central terminals and leaves the first and second terminals constantly separated from each other. The first terminal of a first relay is connected to the interface device, and the second terminal is connected to the computing device. The central terminal of the first data relay is connected to the buffer memory. The intermediate buffer memory is selectively connected by the first data relay solely to the interface device or the second terminal of the first data relay, but not to both simultaneously.

14 Claims, 10 Drawing Sheets

DEVICES AND METHODS FOR OPERATING A COMPUTING SYSTEM COMPRISING A DATA RELAY

CROSS-REFERENCE TO RELATED APPLICATION

This application is a § 371 National Stage filing of International Application PCT/EP/2020/063125, filed May 12, 2020, which designated the United States; this application also claims the priority, under 35 U.S.C. § 119, of German Patent Application 10 2019 208 709. 4, filed Jun. 14, 2019; the prior applications are herewith incorporated by reference in their entirety.

FIELD AND BACKGROUND OF THE INVENTION

The invention relates to computing systems, in particular computing systems in the field of railway technology, and methods for operating computing systems, in particular in the field of railway technology.

In order to supply new data to computing systems in technical systems, such as in vehicles, having a closed network structure, at present data is usually written to portable data carriers (CDs, USB sticks, hard disks) outside the closed network structure and the data carrier is manually introduced into the technical system and connected by maintenance personnel. After connection, the data is then loaded onto the computing systems. A disadvantage of the previous methods is the manual and direct on-site intervention by maintenance personnel.

In computing systems in which parts of the intranet can be regarded as a Category 2 network according to EN 50159, the decoupling can also be achieved by means of a so-called DMZ (demilitarized zone) using multiple firewalls and an application layer gateway (ALG) and then used for data exchange. However, the DMZ must be set up separately and regularly updated. The firewall rules that have been configured must also be checked regularly, as they could also be changed via the network structure, consciously or unconsciously.

A further disadvantage of a DMZ in the field of railway technology is that the assurance of the property of the ALG cannot be directly proven or verified among the aspects of a railway network. An ALG is approved in the field of railway technology on an individual system or individual vehicle basis and must be renewed every time the software or hardware are updated.

SUMMARY OF THE INVENTION

The object of the invention is to specify a computing system that allows data to be transferred simply and safely to a computing device of the computing system.

This object is achieved according to the invention by a computing system having the features described below. Advantageous configurations of the computing system according to the invention are specified in the dependent claims.

According to the invention, it is provided that the computing system comprises an input data path which connects an interface device of the computing system to the computing device, the input data path has at least two data relays and at least one buffer memory for temporarily storing data, each of the at least two data relays has a first and second terminal and a central terminal each, and each can selectively connect either its first terminal and its central terminal or its second terminal and its central terminal and leaves its first and second terminals constantly disconnected from each other, a first of the at least two data relays is connected with its first terminal to the interface device and with its second terminal to the computing device, and the central terminal of the first data relay is connected to the at least one buffer memory, which is selectively connected by means of the first data relay exclusively to the interface device or to the second terminal of the first data relay, but not to both simultaneously.

An essential advantage of the computing system according to the invention is that the use according to the invention of the data relays makes it possible to decouple the computing device from the interface device and data that is sent to the computing device can be first stored in the buffer memory and verified by an intermediate authority. Forwarding of the data to the computing device can therefore be made dependent, for example, on whether the data originate from an authorized data sender or have correct checksums.

Preferably, at least one intermediate computing device is provided, which is connected to the first terminal of a second of the at least two data relays.

In the first advantageous variant, it is provided that the second terminal of the first data relay is connected to the central terminal of the second data relay, the second terminal of the second data relay is connected directly to the computing device or indirectly via one or more additional data relays to the computing device and—given a suitable position of the relay—direct data access by the computing device to the buffer memory is possible via the data relays.

It is also particularly advantageous if one or more additional data relays are present, which with the first and second data relay form a relay cascade in which the first data relay in the relay cascade is connected with its first terminal to the interface device and the last data relay in the relay cascade is connected with its second terminal to the computing device, and direct data access by the computing device to the buffer memory is possible via the data relays if the second terminal is connected to the central terminal in all data relays.

In the latter variant, it is also advantageous if two or more data relays of the relay cascade are each assigned an intermediate computing device and the intermediate computing devices are each connected to the first terminal of the assigned data relay, and each of the intermediate computing devices checks data stored in the buffer memory by the interface device for forwarding to the computing device and in turn issues an enable signal for the through-connection of the relay cascade if the check does not indicate any reason for obstruction.

A relay control device is preferably provided for controlling the data relays.

The relay control unit preferably controls the data relays in such a way that direct data access from the computing device to the buffer memory is possible if the at least one intermediate computing device, preferably all intermediate computing devices in the case of a plurality of intermediate computing devices, issues an enable signal to the relay control device for direct data access.

In a second advantageous variant, it is provided that the intermediate computing device is connected to the second terminal of the first data relay and the first terminal of the second data relay, an additional buffer memory is connected to the central terminal of the second data relay, and the intermediate computing device checks data stored by the interface device in the buffer memory connected to the first data relay for forwarding to the computing device and forwards this data to the buffer memory connected to the second data relay if the check does not indicate any reason for obstruction.

In the latter variant, it is advantageous if one or more additional data relays are provided, which with the first and second data relays form a relay cascade in which the first data relay in the relay cascade is connected with its first terminal to the interface device and the last data relay in the relay cascade is connected with its second terminal to the computing device, at least one pair of consecutive data relays of the relay cascade, preferably all pairs, is each assigned an intermediate computing device which is connected to the first terminal of the frontal data relay of the respective relay pair—viewed in the cascade direction toward the computing device—and to the second terminal of the rear data relay of the respective relay pair—viewed in the cascade direction toward the computing device—and which in each case checks the data stored in the buffer memory connected to the rear data relay and intended for forwarding to the computing device, and forwards said data to the buffer memory connected to the frontal data relay if the check does not indicate a reason for obstruction.

It is also advantageous if the at least one intermediate computing device, or at least one of the intermediate computing devices, is assigned an auxiliary computing device which is connected to the intermediate computing device via an auxiliary relay and an auxiliary buffer memory, the intermediate computing device performs a preliminary check of the data stored in the buffer memory connected to the assigned data relay (e.g. the second relay) for forwarding to the computing device, and sends a request concerning the stored data to an external central unit, the auxiliary computing device is designed to store enable information in the auxiliary buffer memory via the auxiliary relay when a positive feedback signal indicating the usability of the stored data is received from the external central unit, and, if the enable information is available in the auxiliary buffer, the intermediate computing device issues an enable signal for switching over the assigned data relay, in particular the second relay, to allow data flow in the direction of the computing device.

In addition, it is advantageous if at least one intermediate computing device or at least one of the computing devices and/or the interface device is assigned a restart device, which is coupled to the intermediate computing device or the interface device via the second data relay or an auxiliary relay and an auxiliary buffer memory, and the restart device is suitable for generating a boot file that allows the intermediate computing device or the interface device to be restarted and to store this file in the auxiliary buffer memory.

With a view to decoupling the buffer memory, it is considered advantageous if the first or second terminal in at least one data relay is unassigned.

The checking of the data to be transmitted to the computing device, which is to be performed by the intermediate computing device or the intermediate computing devices, preferably comprises at least one, more than one, or all of the following checking steps:
  checking sequence numbers,
  checking signatures,
  forming and checking checksums,
  checking the origin of the data on a cryptographic basis,
  virus scanning,
  verifying TANs.

The invention also relates to a railway technology system, in particular a signal tower or a railway vehicle. According to the invention, it is provided in this respect that the railway technology system has a computing system as described above.

The invention also relates to a method for operating a computing system, in particular a computing system as described above. According to the invention, it is provided that data to be forwarded from an interface device towards the computing system is routed via an input data path which connects an interface device of the computing system to the computing device, the input data path has at least two data relays and at least one buffer memory for temporarily storing data, each of the at least two data relays has a first and second terminal and a central terminal each, and each can selectively connect either its first terminal and its central terminal or its second terminal and its central terminal and leaves its first and second terminals constantly disconnected from each other, a first of the at least two data relays is connected with its first terminal to the interface device and with its second terminal to the computing device, the central terminal of the first data relay is connected to the at least one buffer memory, which is selectively connected by means of the first data relay exclusively to the interface device or to the second terminal of the first data relay, but not to both simultaneously, and the data is forwarded via at least the first data relay and the buffer memory connected to the first data relay.

With regard to the advantages and advantageous embodiments of the method according to the invention, reference is made to the above statements in connection with the computing system according to the invention, which apply equally to the method according to the invention.

The invention is explained in more detail in the following by means of exemplary embodiments.

DETAILED DESCRIPTION OF THE INVENTION

For the sake of clarity, the same reference signs are always used in the figures for identical or comparable elements.

Figure 1:
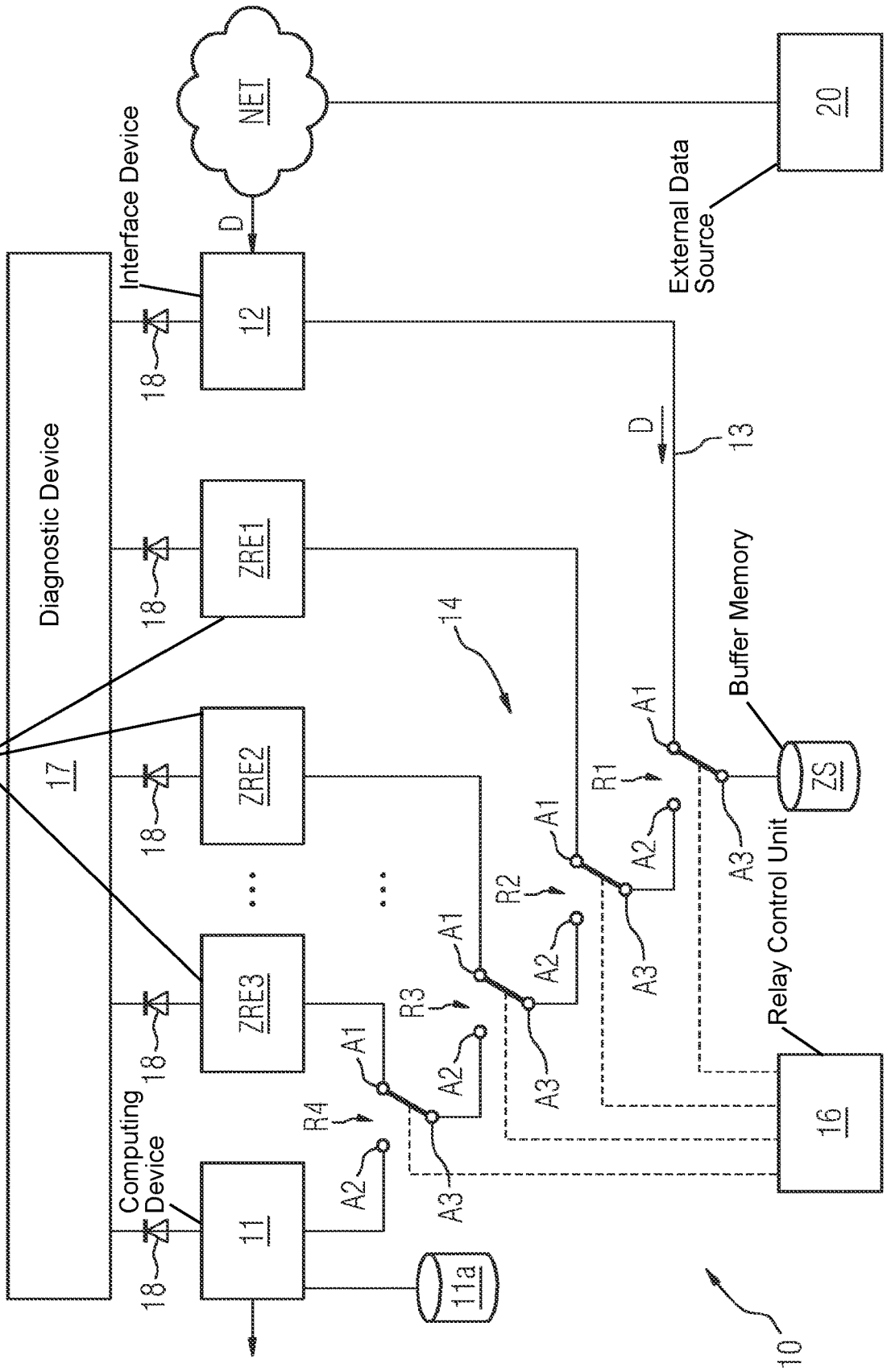
FIG. 1 shows an exemplary embodiment of a computing system according to the invention, on the basis of which a first exemplary embodiment of a method according to the invention is explained.

FIG. 1 shows an exemplary embodiment of a computing system 10, which can form part of a railway technology system, for example. The computing system 10 is equipped with a computing device 11 to which data D can be transmitted from an external data source 20. For this purpose, the computing system 10 comprises an interface device 12, which can communicate with the external data source 20, for example, via the internet or another communication network NET.

An input data path 13 connects the interface device 12 to the computing device 11. The input data path 13 comprises a first data relay R1, a second data relay R2 and additional data relays R3 and R4, which form a relay cascade 14. Each data relay R1-R4 has a first terminal A1, a second terminal A2, and a central terminal A3. The data relays R1-R4 are each designed in such a way that they can either connect their first terminal A1 to the central terminal A3 or their second terminal A1 to the central terminal A3; the first and second terminals A1, A2 are constantly disconnected from each other.

The first terminal A1 of the first data relay R1 is connected to the interface device 12, the second terminal A2 of the first data relay R1 is connected to the central terminal A3 of the second data relay R2. The central terminal A3 of the first data relay R1 is connected to a buffer memory ZS.

The inner data relays R2-R3 of the relay cascade 14 are interconnected in such a way that the second terminal A2 of the upstream data relay in the relay cascade 14 is connected to the central terminal A3 of the downstream data relay in the relay cascade 14.

The last data relay R4 in the relay cascade 14 is connected with its second terminal A2 to the computing device 11.

FIG. 1 shows that direct data access from the computing device 11 to the buffer memory ZS is possible if the second terminal A2 is connected to the central terminal A3 in all data relays R1-R4 of the relay cascade 14.

An intermediate computing device ZRE1-ZRE3 is connected to the first terminal A1 of the second data relay R2 and the additional data relays R3-R4 of the relay cascade 14. The task of each of the intermediate computing devices ZRE1-ZRE3 is to check the data D stored in the buffer memory ZS by the interface device 12 for forwarding to the computing device 11 and to issue an enable signal for the through-connection of the relay cascade 14 if the check does not indicate a reason for obstruction, or returns a positive test result. If a reason for obstruction is detected, a blocking signal for blocking the relay cascade 14 is generated instead.

A relay control unit 16 is provided for controlling the data relays R of the relay cascade 14. The relay control unit 16 is connected to the intermediate computing devices ZRE1-ZRE3 via cables, not shown, and evaluates their test results. The relay control unit 16 controls the data relays in such a way that direct data access from the computing device 11 to the buffer memory ZS is possible only if all intermediate computing devices ZRE1-ZRE3 of the relay control unit 16 issue an enable signal for direct data access.

For example, the arrangement according to FIG. 1 can be operated as follows:

First, the relay control unit 16 sets the data relays R1-R4 of the relay cascade 14 to a defined initial state (see FIG. 1), in which the central terminal A3 is connected to the first terminal A1 in each case.

If the interface device 12 receives data D from the external data source 20, it stores the data D in the buffer memory ZS. If data D has been saved, the interface device 12 notifies the relay control unit 16 of this.

Figure 2:
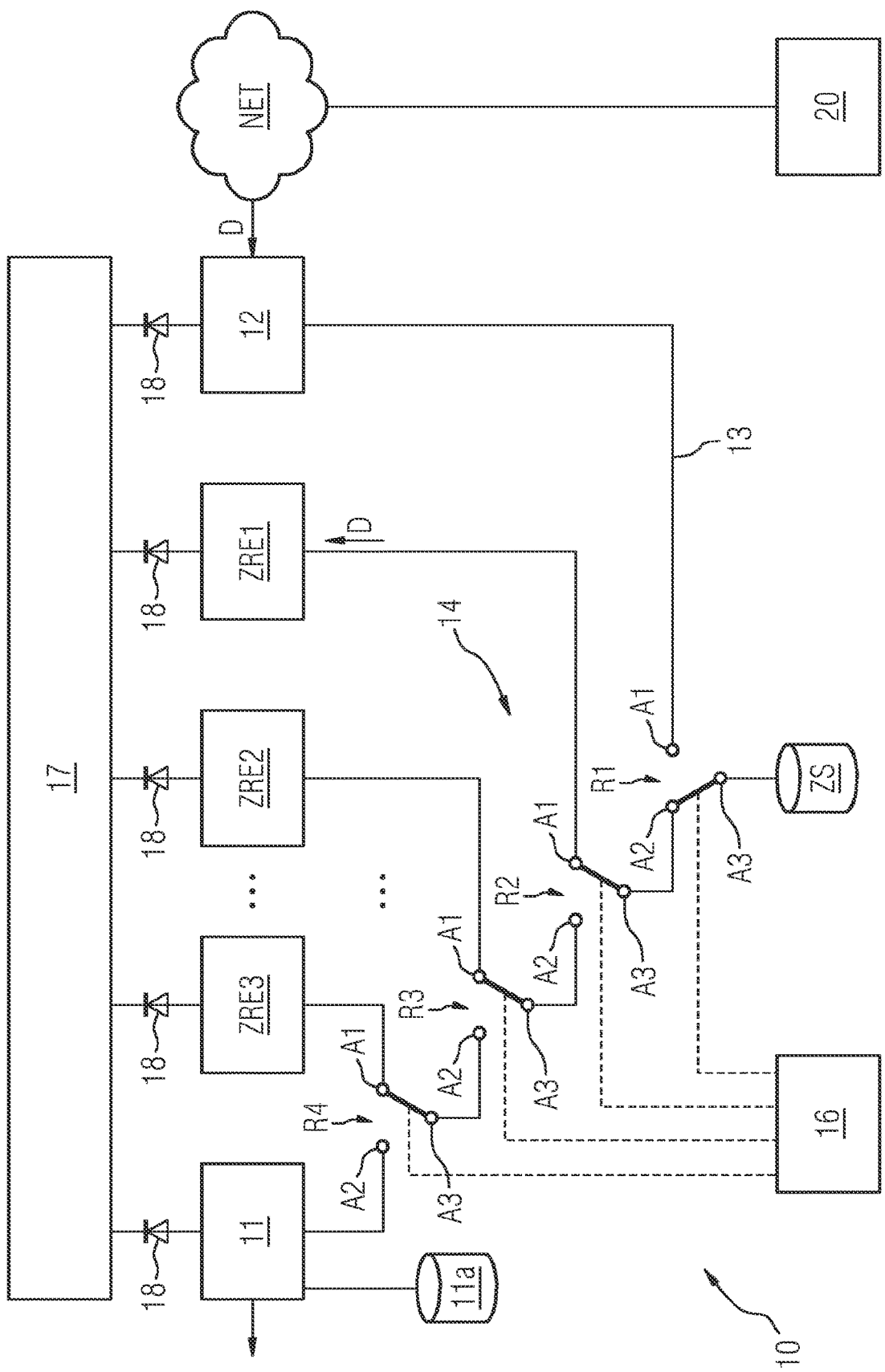
FIGS. 2-4 show other possible switching states of the data relays in the first exemplary embodiment.

In subsequent steps the relay control unit 16 will change over the data relays R of the relay cascade 14 successively:

In a first step, the first data relay R1 is switched over (see FIG. 2) and the buffer memory ZS is thus connected to the intermediate computing device ZRE1 (hereafter referred to as the first intermediate computing device ZRE1) connected to the first data relay R1. The first intermediate computing device ZRE1 checks the data D. If, from the point of view of the first intermediate computing device ZRE1, this data is suitable for forwarding to the computing device 11, it sends a corresponding enable signal to the relay control unit 16; otherwise, it sends a blocking signal.

Figure 3:
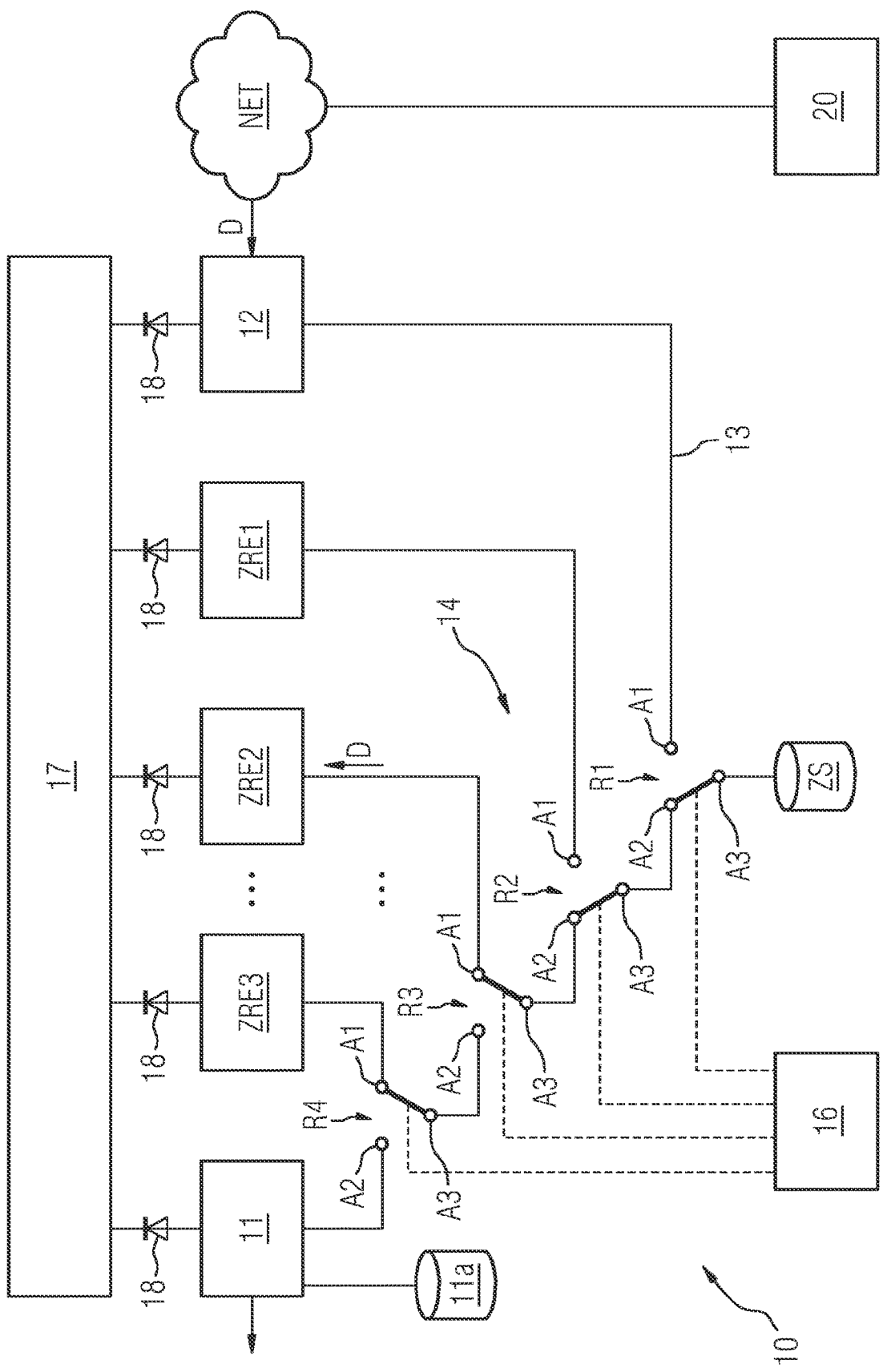

If an enable signal is received from the first intermediate computing device ZRE1, in a second step the relay control device 16 switches over the second data relay R2 (see FIG. 3) and thus connects the buffer memory ZS to the intermediate computing device ZRE2 (hereafter referred to as the second intermediate computing device ZRE2) connected to the second data relay R2. Now the second intermediate computing device ZRE2 checks the data D. If, from the point of view of the second intermediate computing device ZRE2, this data is suitable for forwarding to the computing device 11, the device sends a corresponding enable signal to the relay control unit 16; otherwise, it sends a blocking signal.

The third data relay R3 of the relay cascade 14 is then switched over in a similar manner, so that the third intermediate computing device ZRE3 can check the data D in the buffer memory ZS.

Figure 4:
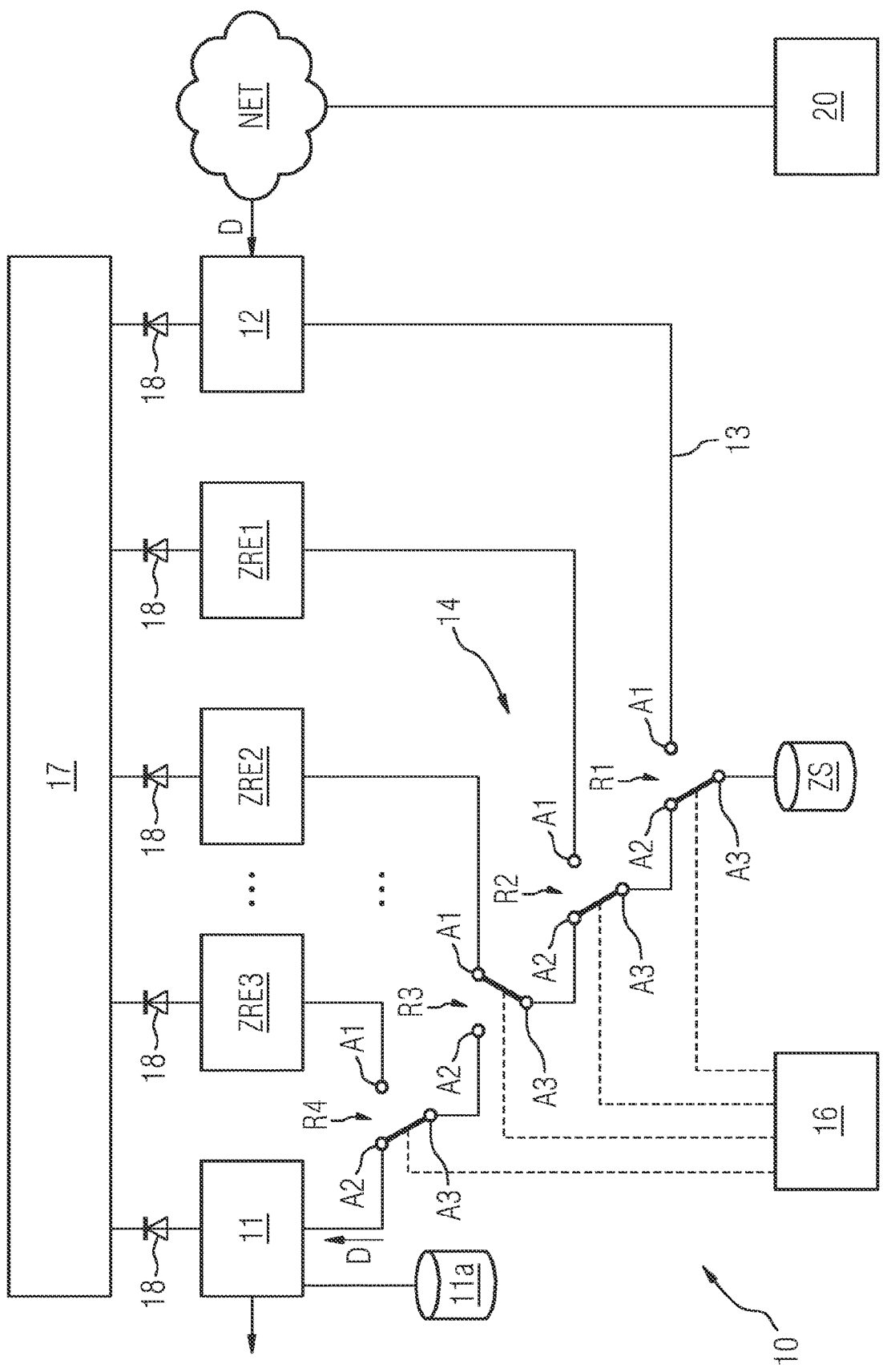

If an enable signal is present from all intermediate computing devices ZRE1-ZRE3, the last data relay R4 of the relay cascade 14 is switched over and thus the computing device 11 is allowed access to the data D in the buffer memory ZS. This switching state of the relay cascade 14 is shown in FIG. 4. For example, the computing device 11 can copy the data D into its own memory 11a.

The intermediate computing devices ZRE1-ZRE3 can also send their check results to a higher-level diagnostic device 17, to which they are connected, preferably via a data diode 18 in each case.

In the exemplary embodiment according to FIGS. 1 to 4, the relay cascade 14 is used to connect the computing device 11 directly to the buffer memory ZS if the check of the data D by the intermediate computing devices ZRE1-ZRE3 returned a positive result.

Figure 5:
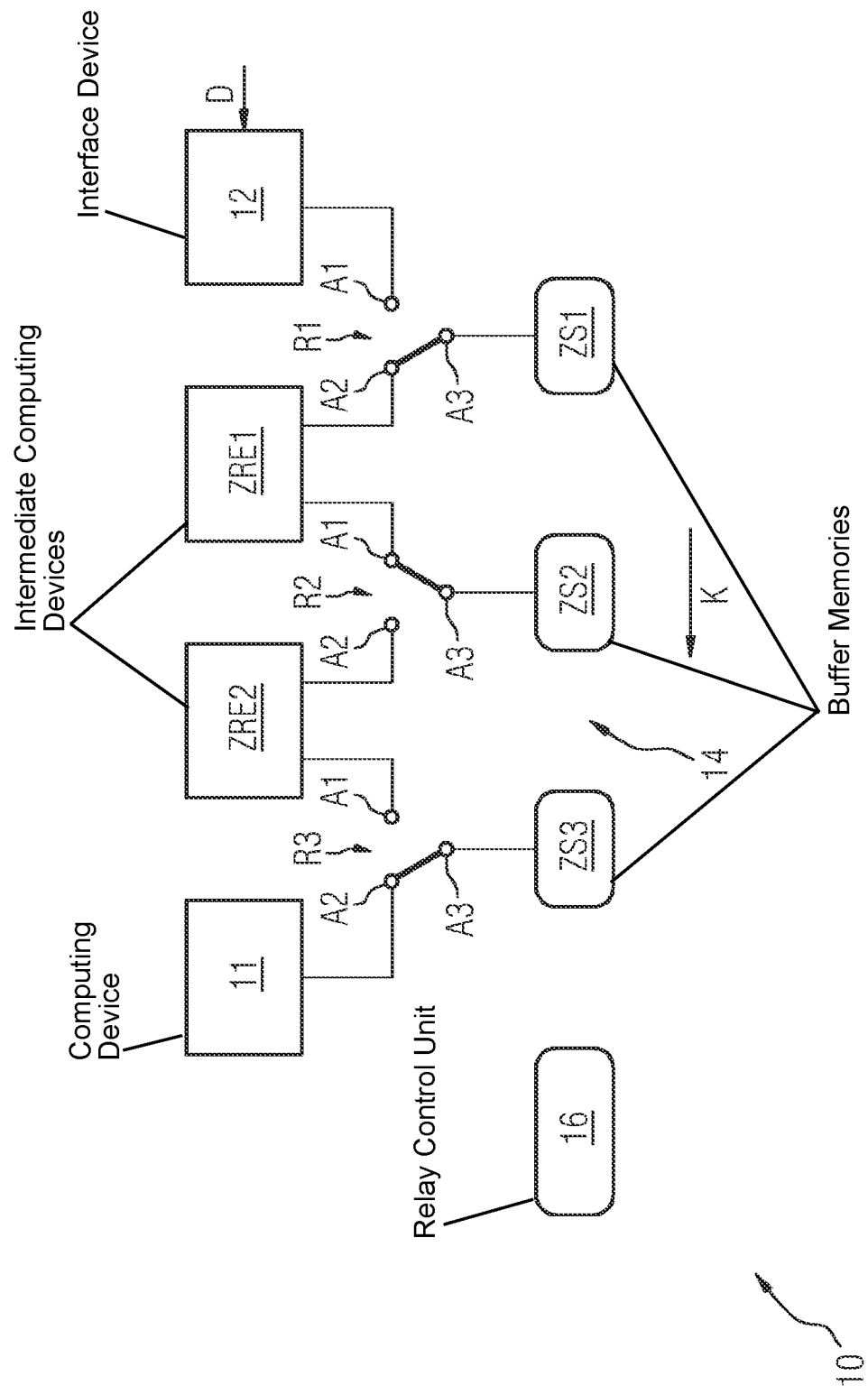
FIG. 5 shows another exemplary embodiment of a computing system according to the invention, on the basis of which a second exemplary embodiment of a method according to the invention is explained.

FIG. 5 shows another exemplary embodiment. In the exemplary embodiment according to FIG. 5, a buffer memory ZS1, ZS2, ZS3 is connected to the central terminals A3 of each data relay R1, R2, R3.

Each pair of consecutive data relays R1, R2, R3 of the relay cascade 14 is assigned an intermediate computing device ZRE1, ZRE2, which is connected to the first terminal A1 of the frontal data relay of the respective relay pair—viewed in the cascade direction K toward the computing device 11—and to the second terminal A2 of the rear data relay of the respective relay pair—viewed in the cascade direction toward the computing device 11.

Each intermediate computing device ZRE1, ZRE2 checks the data D stored in the buffer memory ZS1, ZS2 connected to the rear data relay. If the check shows that data D is suitable for forwarding to the computing device 11, it stores the data D in the buffer memory ZS2, ZS3 connected to the frontal data relay.

FIG. 5 shows a switching state in which the first intermediate computing device ZRE1 checks the data D stored in the first buffer memory ZS1 and—if the check result is positive—stores it in the second buffer memory ZS2.

Figure 6:
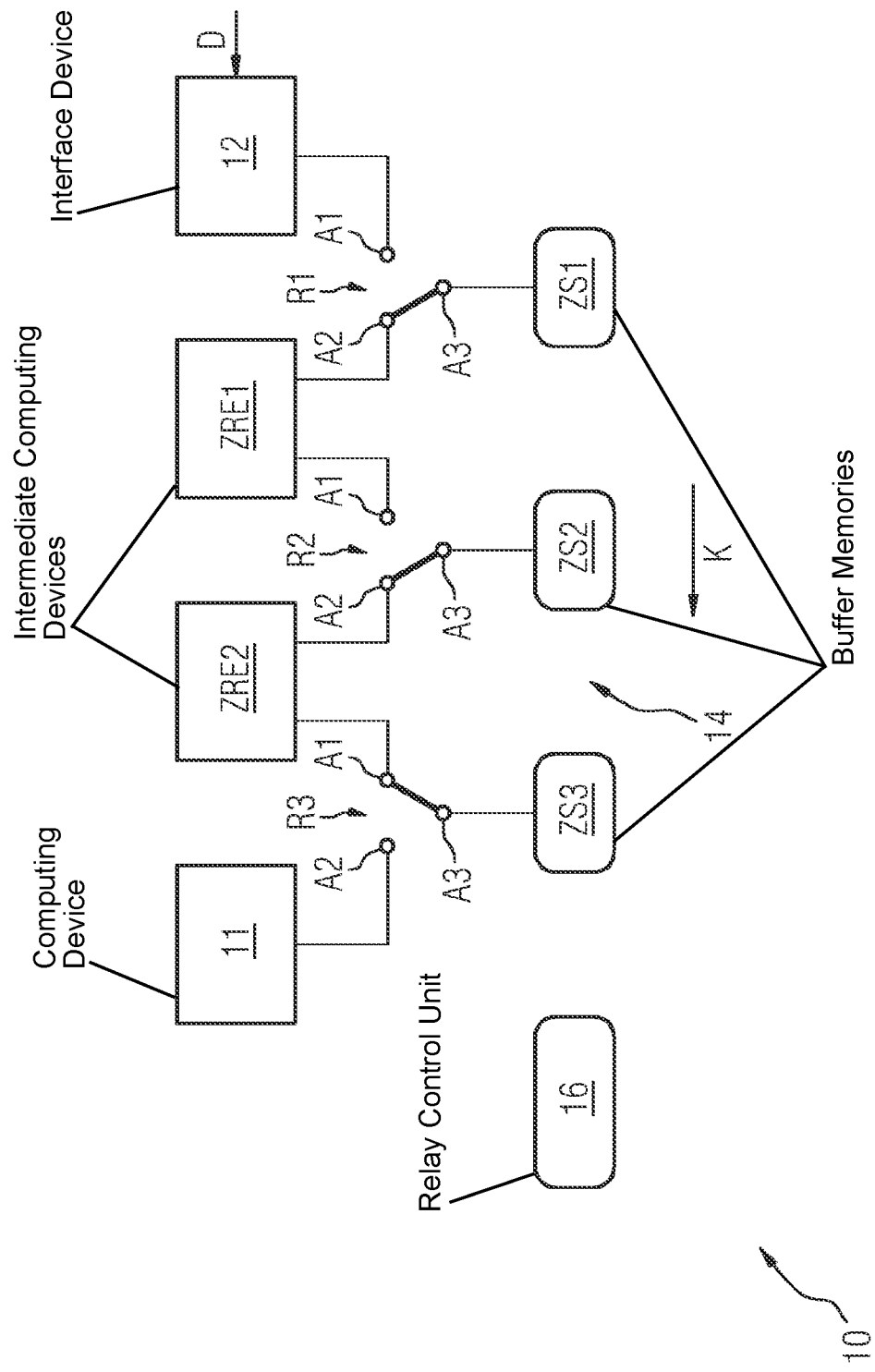
FIG. 6 shows a different switching state of the data relays in the second exemplary embodiment according to FIG. 5.

FIG. 6 shows the next switching state. In the next switching state, the second intermediate computing device ZRE2 checks the data D stored in the second buffer memory ZS2 and stores it—if the check result is positive—in the third buffer memory ZS3.

If the third relay R3 is then switched over, the computing device 11 can access the data D.

Figure 7:
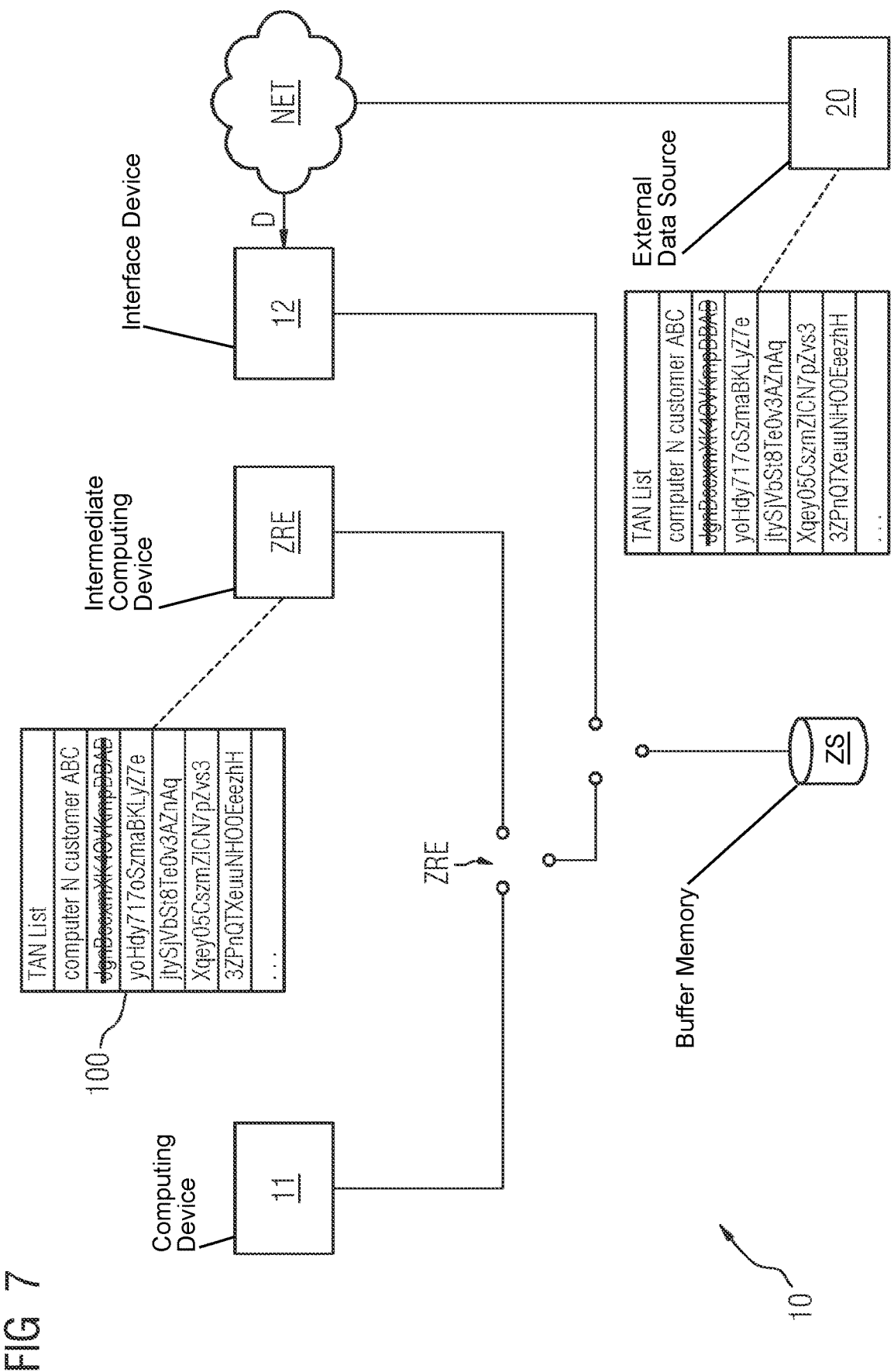
FIG. 7 shows an exemplary embodiment of a TAN check.

FIG. 7 shows an exemplary embodiment of a computing system 10 with an intermediate computing device ZRE that can perform a TAN test step. The TAN test step examines whether data D contains a TAN sequence number that is expected or is valid according to a predefined TAN list 100. If the data D has the correct TAN sequence number or a valid TAN sequence number according to the TAN list 100, the TAN test step is considered to have been passed and further test steps are carried out if necessary. Otherwise, the data check is considered not to be passed and forwarding of the data D to the computing device 11 is blocked.

A corresponding TAN test step can also be carried out by the intermediate computing devices in the computing systems according to FIGS. 1 to 6 and 8 to 10.

Figure 8:
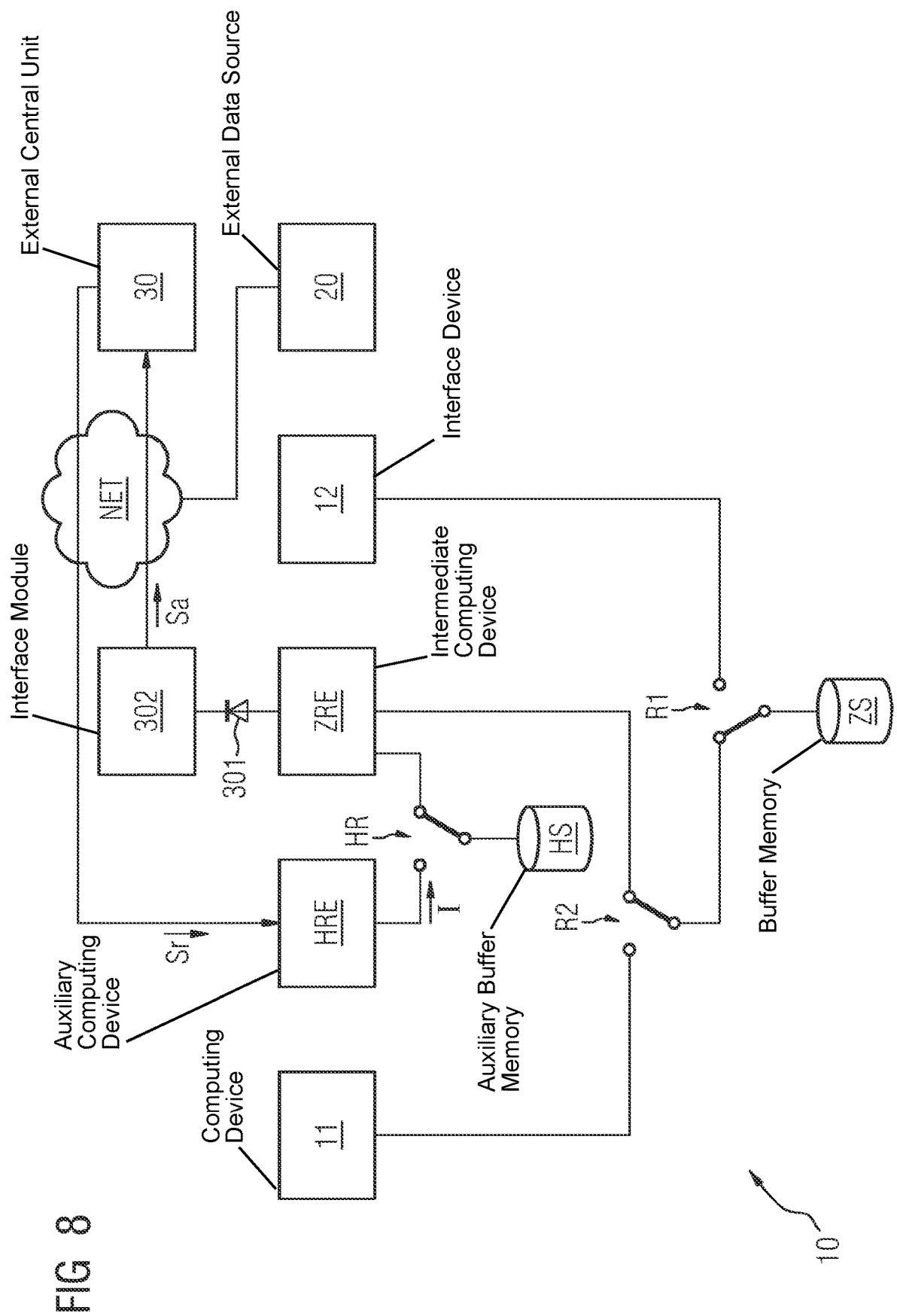
FIG. 8 shows an exemplary embodiment of a computing system according to the invention in which an auxiliary computing device and an auxiliary buffer memory are assigned to an intermediate computing device.

FIG. 8 shows an exemplary embodiment of a computing system 10 with an intermediate computing device ZRE to which an auxiliary computing device HRE is assigned. The intermediate computing device ZRE is connected to the auxiliary computing device HRE via an auxiliary relay HR and an auxiliary buffer memory HS.

The intermediate computing device ZRE performs a preliminary check of the data D stored in the buffer memory ZS by the interface device 12 for forwarding to the computing device 11. The preliminary check may include, for example, checking the origin of the data D by means of certificates or the integrity of the data D by means of a checksum test.

If the data D is suitable for forwarding to the computing device 11 from the point of view of the intermediate computing device ZRE, it sends a request Sa concerning the stored data D to an external central unit 30 via a data diode 301 and an interface module 302.

In turn, the external central unit 30 then checks the usability of the data D and—if the check result is positive—sends a positive feedback signal Sr indicating the usability of the stored data D to the auxiliary computing device HRE. The checking of the external central unit 30 can include, for example, checking whether certificates are valid or not.

After receiving the feedback signal from the external central unit, the auxiliary computing device HRE stores enable information I in the auxiliary buffer memory HS via the auxiliary relay HR. If the enable information I is present in the auxiliary buffer memory HS, the intermediate computing device ZRE issues an enable signal for switching over the assigned second data relay R2 to allow a data flow in the direction of the computing device 11.

If the intermediate computing device ZRE is enabled, the relay control unit 16 switches over the second data relay R2 so that the computing device 11 can access the buffer memory ZS, as was explained above by way of example in connection with FIGS. 1 to 7.

As an aside, corresponding auxiliary relays HR and auxiliary buffer memories HS can be assigned to the intermediate computing devices ZRE of the computing systems according to FIGS. 1 to 7 and 9 to 10.

Figure 9:
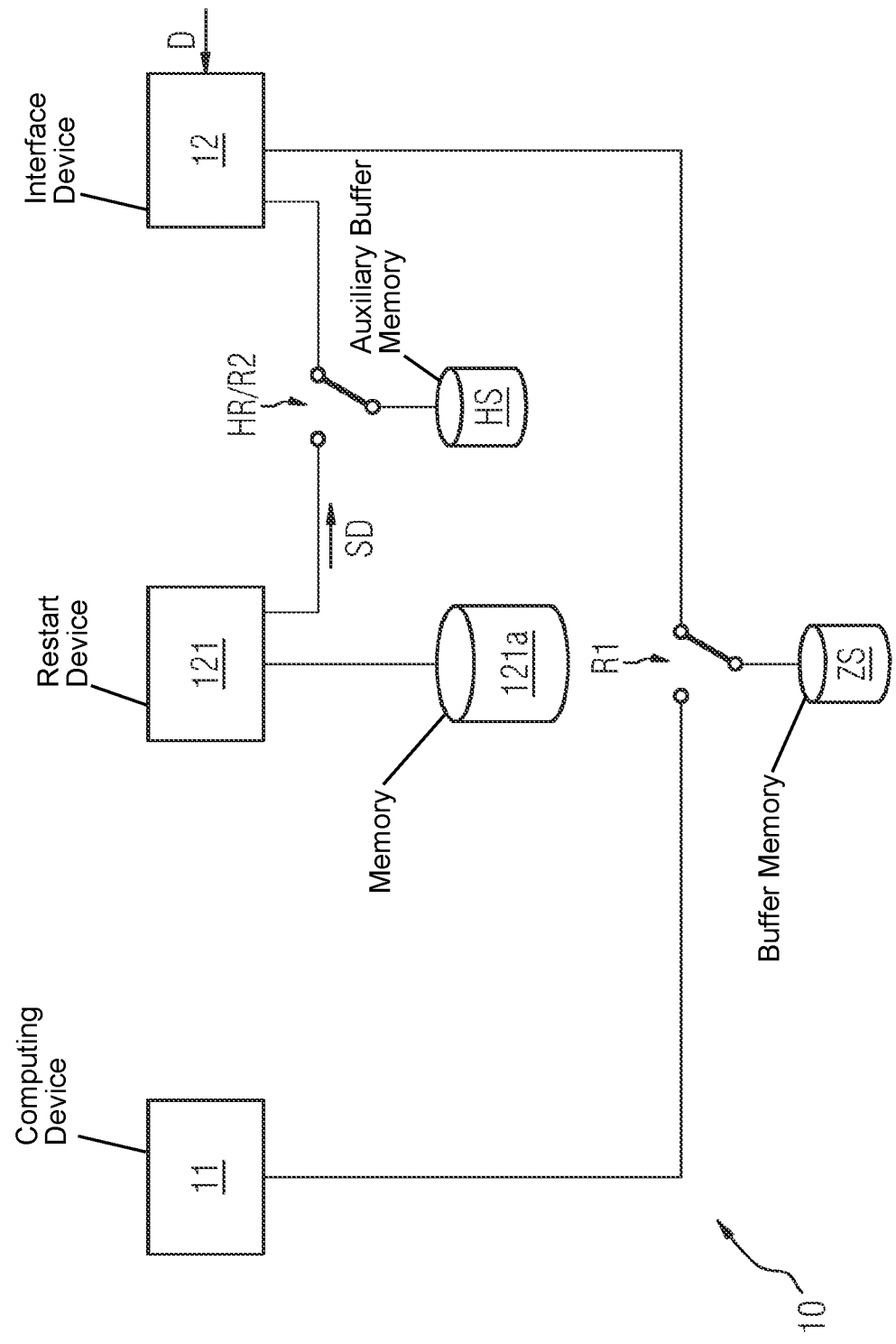
FIG. 9 shows an exemplary embodiment of a computing system according to the invention in which a restart device is assigned to an interface device.

FIG. 9 shows an exemplary embodiment of a computing system 10 in which the interface device 12 is equipped with a reboot function. For this purpose, the interface device 12 is assigned a restart device 121 which is connected to the interface device 12 via an auxiliary relay HR and an auxiliary buffer memory HS. The auxiliary relay HR here forms a second relay R2 of the computing system 10. The restart device 121 is designed to generate a boot file SD that allows the interface device 12 to be restarted and to store this file in the auxiliary buffer memory HS. To generate the boot file, the restart device 121 can access software stored in a memory 121a, for example.

The boot file SD allows the interface device 12 to be restarted if it is unable to operate or no longer operate reliably, due to an external attack using malicious data D, for example.

Corresponding restart devices 121, auxiliary relays HR and auxiliary buffer memories HS can also be assigned to the intermediate computing devices ZRE in the computing systems according to FIGS. 1 to 8 and 10.

Figure 10:
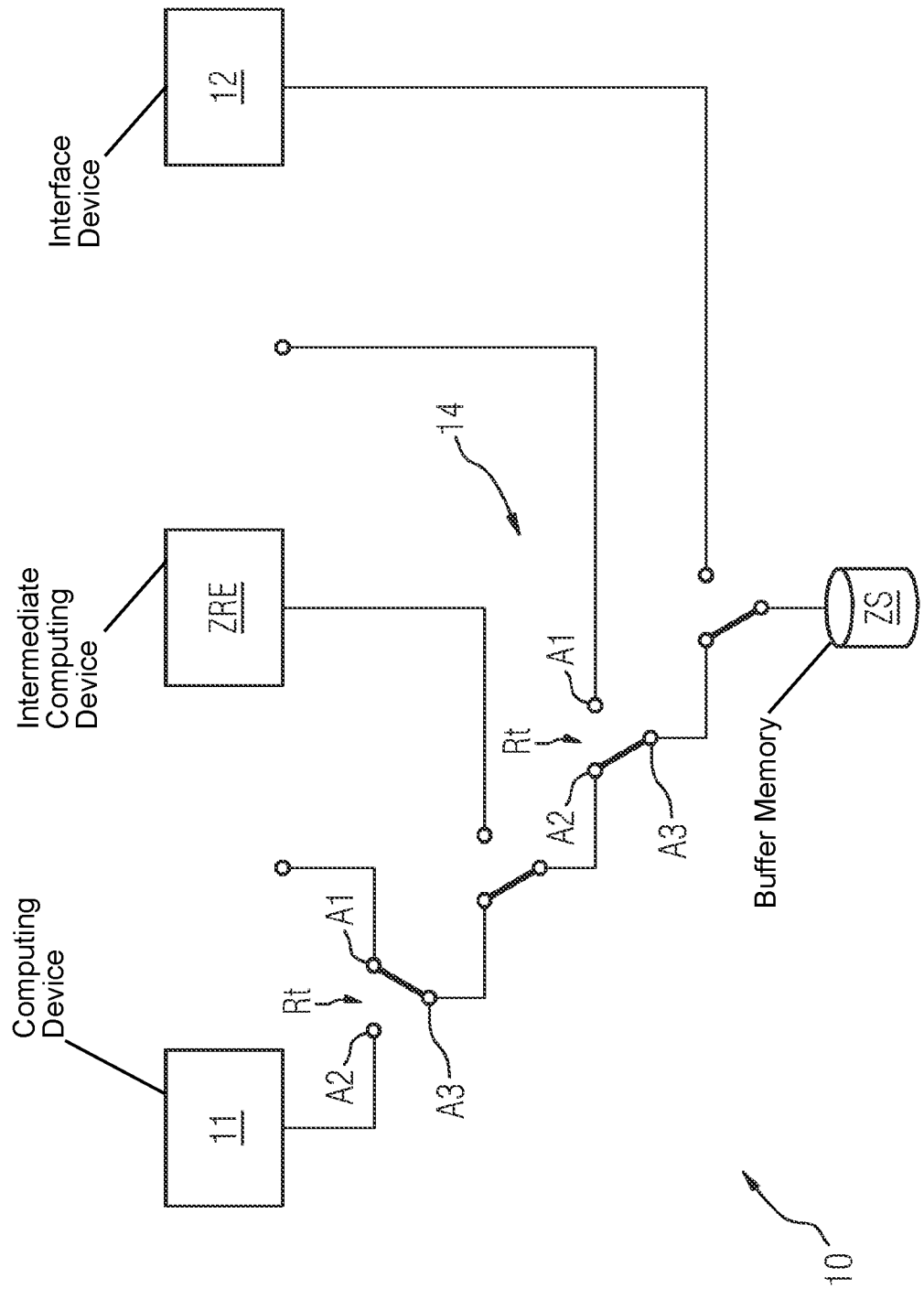
FIG. 10 shows an exemplary embodiment of a computing system according to the invention in which at least two relays have unassigned terminals for simultaneously disconnecting the buffer memory from the interface device and the computing device.

FIG. 10 shows an exemplary embodiment of a computing system 10 in which two data relays form isolating relays Rt. In the two isolation relays Rt, the first terminal A1 is not assigned. The isolating relays Rt enable a switching position of the relay cascade 14, in which the buffer memory ZS is neither connected to the computing device 11 nor to the interface device 12.

The exemplary embodiments described above based on FIGS. 1 to 10 can have the following features or advantages, given as bullet points, either individually or in combination:

- The (internal) intermediate computing devices preferably check the data D and generate a message externally via a diagnostic channel in the event of abnormalities/discrepancies. After a positive test result, the data D can be left on the data carrier and a check trace of the intermediate computing device can be left on the data carrier.
- The intermediate computing devices are preferably not directly accessible either from outside or from the internet or an internal network and therefore preferably cannot be modified or manipulated. This ensures that functions that have already been demonstrated to be present will continue to perform their task in the future. An external attack on the intermediate computing devices (internal computers) is thus made more difficult.
- The internal intermediate computing devices can check the data on the data carrier for, e.g., integrity, freedom from viruses, authenticity, file name structure, . . . , etc. It is also possible to filter out data that is only intended for a specific technical system. This data can be recognized by a separate indicator/feature in the data itself.
- Each computer, in particular each intermediate computing device, preferably leaves an entry or a check trace about the successful check on the data carrier, so that subsequent computers can view the results, e.g. whether a check of a particular computer has taken place. This trace can also be checked by the final system computer at the end of the chain and it can be determined whether all computers involved have been included in the check.
- A combination of different methods can be used. Depending on the assessment of security and robustness, it is also possible to use only one method. The tasks should preferably be carried out by different computers. However, it is also possible to carry out the above-mentioned functions consecutively on a computer.
- The integrity can be verified by using various checking methods and checksums, e.g. MD4, MD5, SHA1, etc. The test values are preferably prepared in advance by the data supplier and are transferred to the computing system during uploading. When determining the checksums, a secret (salt) can additionally be used, which is known only to the authorized data transmitter and the checking computer. One or more checking methods can be used for a configuration. If there is data on the data carrier that do not have the correct checksums, they are preferably deleted. In a particularly strict implementation, all the data D on the data carrier could be deleted. In the event of abnormalities, this action is preferably transmitted externally via a diagnostic channel (e.g. DataDiode DCU Data Capture Unit). This can be used outside of the method to detect the fact that abnormalities have occurred here.

By the data being cryptographically signed by the data transmitter (submitter), an internal computer can check whether the data has been signed by the authorized person before the data is passed on or forwarded. The corresponding cryptographic keys are preferably also configured during the configuration of the device. Here again, data that has not been properly signed could be deleted.

A further method can check the data transmitted on the data carrier for freedom from viruses and malware, and in case of abnormalities only delete the data or the entire data carrier and report the abnormality via the diagnostic channel.

It is also possible to supply and set up computers with new boot images. For this purpose, the boot data carrier with the boot image for the computer is preferably decoupled after a power-off or shutdown, e.g. by a control computer, and coupled to a deployment computer. This deployment computer can, for example, format the data carrier after it has been mounted and install a fresh boot image on the computer, e.g. under Unix using the command sudo dd if=fresch_boot_iso_image.iso of=/dev/sdx bs=1M && sync.

A deployment computer can hold different versions of images and provide a different boot image if necessary. After the successful installation of the new boot image, the boot data carrier is preferably reconnected to the original computer and this computer is rebooted. This causes the computer to receive a new task or return to its original state. If, for example, traces of an attack, e.g. extra user accounts, had been previously present due to attacks, these will no longer be available. If the fresh boot image has been updated to the deployment computer by a local software update, improvements can also be made to the configuration, e.g. of the operating system. It is also possible to use a plurality of data carriers at the same time.

In the examples of variants described above, for example, only one data record D is transferred from one computer to the next. This procedure can be extended to n data records and n data carriers. For example, two input and two output data carriers can be used per computer. The data can then be copied from the input data carrier to the output data carrier after successful tests or checking steps. After disconnecting, the data carrier is preferably returned, which means the turnaround times can be optimized.

In a single-computer configuration for a data carrier lock, only one internal computer is used. This preferably starts with different boot images which are transferred to it one after the other by a control computer and a deployment computer. For example, the internal computer boots first with the virus scanner program and terminates after a successful check. The boot image is then preferably reconfigured by the deployment server and the internal computer is rebooted, in this case, for example, with checksum test routines. This sequence is repeated as often as necessary until all the different tasks of the internal computers have been processed.

More complex variants can be created using diverse inputs, routes with diverse filters and a subsequent merging operation. For example, parts of data across different input chains can be merged by a merge computer.

For example, using a separate system-specific TAN sequence number for uploads, data can only be imported if the internal TAN matches the TAN provided by external sources. Used TANs are preferably removed from the list and no longer used.

Using an additional construct it is possible to extend the method to include a two-factor authentication. In this case, an internal computer preferably sends a request via a data diode to an external (possibly cloud) verification computer in order to enable an external verification. For this purpose, the entire test object or a hash value can be transferred to the verification computer. This verification computer can generate a further checksum or signature for the test object. The result of the second external verification by the verification computer is then preferably transferred back to the internal computer. The data is only transferred to the next computer if the verification computer's response matches the expected response. In this case, inter alia, a kind of 2FA-method similar to Google could be used.

The checks carried out by the various computers can be logged by the internal computers, cryptographically signed and transferred to the successor computer. This creates a kind of test trace over the course of the test chain. Each computer of a trace leaves its signature on the data carrier for the checks that produced a positive result. A corresponding signature for abnormalities is also possible. A configuration can be used to determine in advance which computers are to be included consecutively in the check. As a result, the last internal computer can use the configuration of the trace and the information to determine whether all the relevant computers of the trace were integrated and have left behind their signatures.

Should it be necessary for the data carriers to remain in a "neutral" position between switching over two computers, the circuit can be designed accordingly.

The interface device, which is formed, for example, by an external internet-enabled computer, can—as described above—be restored to its original state or rebooted.

Updating of the computers, in particular the other external computer, is also very easily possible due to the distributed architecture.

In the described methods, a complete protocol breach can be achieved during data transmission.

It is possible that only one computer is ever connected to a data carrier at a time; thus, a clean decoupling of the data carrier can be carried out.

The internal computers can even be very simple and small computers.

Although the invention has been illustrated and described in detail by means of preferred exemplary embodiments, the invention is not restricted by the examples disclosed and other variations can be derived therefrom by the person skilled in the art without departing from the scope of protection of the invention.

The invention claimed is:

1. A computing system, comprising:
   a computing device;
   an interface device;
   an input data path connecting said interface device to said computing device, said input data path having at least two data relays and at least one buffer memory for temporarily storing data
   each of said at least two data relays having respective first and second terminals and a respective central terminal, and each of said at least two data relays configured to selectively interconnect either said first terminal and said central terminal thereof or said second terminal and said central terminal thereof, and to leave said first and second terminals constantly disconnected from each other;
   said at least two data relays including at least a first data relay and a second data relay, said first terminal of said first data relay being connected to said interface device and said second terminal of said first data relay being connected directly through said second data relay or indirectly through said second data relay and one or more additional data relays to said computing device; and
   said central terminal of said first data relay being connected to said at least one buffer memory, and said at least one buffer memory being selectively connected by said first data relay exclusively to said interface device or to said second terminal of said first data relay, but not simultaneously to both of said interface device and said second terminal of said first data relay.

2. The computing system according to claim 1, wherein at least one intermediate computing device is connected to said first terminal of said second data relay.

3. The computing system according to claim 2, wherein:
   said second terminal of said first data relay is connected to said central terminal of said second data relay;
   said second terminal of said second data relay is directly connected to said computing device or is indirectly connected by said one or more additional data relays to said computing device and
   said data relays are configured to enter a suitable relay position permitting a direct data access from said computing device to said at least one buffer memory.

4. The computing system according to claim 2, wherein:
   said at least two data relays including said one or more additional data relays form a relay cascade having said first data relay and a last data relay;
   said first terminal of said first data relay in said relay cascade is connected to said interface device and said second terminal of said last data relay in said relay cascade is connected to said computing device; and
   said second terminal and said central terminal in all of said data relays, including said one or more additional data relays, of said relay cascade configured to be interconnected to permit direct data access from said computing device to said buffer memory through said data relays.

5. The computing system according to claim 4, which further comprises:
   intermediate computing devices each being associated with a respective one of two or more data relays of said relay cascade, said intermediate computing devices each being connected to said first terminal of said respective associated one of two or more data relays; and
   each of said intermediate computing devices configured to check data stored by said interface device in said at least one buffer memory for forwarding to said computing device and, in turn, to issue an enable signal for a through-connection of said relay cascade when the check does not indicate a reason for obstruction.

6. The computing system according to claim 5, which further comprises:
   a relay control unit for controlling said at least two data relays; and
   said relay control unit controlling said at least two data relays to permit direct data access from said computing device to said at least one buffer memory when at least one or all of said intermediate computing devices issue an enable signal to said relay control device for direct data access.

7. The computing system according to claim 5, wherein:
   at least one of said intermediate computing devices is connected to said second terminal of said first data relay and said first terminal of said second data relay;
   an additional buffer memory is connected to said central terminal of said second data relay; and
   said at least one intermediate computing device checks data stored by said interface device in said at least one buffer memory connected to said first data relay for forwarding to said computing device and forwards the data to said additional buffer memory connected to said second data relay when the check does not indicate a reason for obstruction.

8. The computing system according to claim 7, which further comprises:
   said first terminal of said first data relay in said relay cascade being connected to said interface device and said second terminal of said last data relay in said relay cascade being connected to said computing device;
   said relay cascade including pairs of consecutive data relays, each relay pair having a frontal data relay and a rear data relay, as viewed in a cascade direction toward said computing device; and
   at least one or all of said relay pairs of said consecutive data relays each being associated with a respective one of said intermediate computing devices being connected to said first terminal of said frontal data relay of a respective relay pair and to said second terminal of said rear data relay of a respective relay pair, for checking the data stored in said at least one buffer memory connected to said rear data relay and for forwarding to said computing device, and forwarding the data to said at least one buffer memory connected to said frontal data relay when the check does not indicate a reason for obstruction.

9. The computing system according to claim 5, which further comprises:
   an auxiliary relay;
   an auxiliary buffer memory;
   an auxiliary computing device connected to at least one of said intermediate computing devices through said auxiliary relay and said auxiliary buffer memory;
   said at least one intermediate computing device performing a preliminary check of the data stored in said at least one buffer memory connected to said associated one of two or more data relays for forwarding to said computing device and sending a request concerning the stored data to an external central unit;
   said auxiliary computing device configured to store enable information in said auxiliary buffer memory through said auxiliary relay when a positive feedback signal indicating a usability of the stored data is received from the external central unit; and when the enable information is present in said auxiliary buffer memory, said at least one intermediate computing device issuing an enable signal for switching over said associated data relay or said second relay to allow a data flow in a direction of said computing device.

10. The computing system according to claim 5, which further comprises:

an auxiliary relay;

an auxiliary buffer memory;

a restart device associated with at least one of at least one of said intermediate computing devices or said interface device, said restart device being coupled to said at least one intermediate computing device or said interface device through said second data relay or said auxiliary relay and said auxiliary buffer memory; and said restart device configured for generating a boot file allowing said at least one intermediate computing device or said interface device to be restarted and to store the boot file in said auxiliary buffer memory.

11. The computing system according to claim 5, wherein:

at least one of said intermediate computing devices checks the data to be transmitted to said computing device by performing at least one checking step as follows:

checking sequence numbers, or checking signatures, or forming and checking checksums, or checking an origin of the data on a cryptographic basis, or virus scanning, or verifying TANs.

12. The computing system according to claim 1, wherein said first or said second terminal of at least one of said at least two data relays is unassigned.

13. A railway technology system or signal tower or railway vehicle, comprising a computing system according to claim 1.

14. A method for operating a computing system, the method comprising:

connecting an input data path from an interface device to a computing device;

routing data to be forwarded by the interface device toward the computing system over the input data path;

providing the input data path with at least two data relays and at least one buffer memory for temporarily storing data;

providing each of the at least two data relays with respective first and second terminals and a respective central terminal, and using each of the at least two data relays to selectively interconnect the first terminal and the central terminal thereof or the second terminal and the central terminal thereof and leave the first and second terminals thereof constantly disconnected from each other;

connecting the first terminal of a first of the at least two data relays to the interface device and connecting the second terminal of the first data relay directly or indirectly to the computing device;

connecting the central terminal of the first data relay to the at least one buffer memory, and using the first data relay to selectively connect the at least one buffer memory exclusively to the interface device or to the second terminal of the first data relay, but not to both the interface device and the second terminal of the first data relay simultaneously; and using at least the first data relay and the buffer memory connected to the first data relay to forward the data.

\* \* \* \* \*